United States Patent [19]
Plutschuck et al.

[11] Patent Number: 4,934,878
[45] Date of Patent: Jun. 19, 1990

[54] CENTER AND PERIPHERAL CUTTING END MILL

[75] Inventors: Lawrence Plutschuck, Warren; Thomas Conrad, Madison Heights, both of Mich.

[73] Assignee: GTE Valenite Corporation, Troy, Mich.

[21] Appl. No.: 289,946

[22] Filed: Dec. 27, 1988

[51] Int. Cl.$^5$ .............................................. B26D 1/12
[52] U.S. Cl. ...................................... 407/42; 407/40; 407/113; 407/114
[58] Field of Search ...................... 407/42, 40, 48, 55, 407/59, 60, 61, 63, 113, 114

[56] References Cited

U.S. PATENT DOCUMENTS

| | | | |
|---|---|---|---|
| 4,182,587 | 1/1980 | Striegl | 407/55 |
| 4,556,345 | 12/1985 | Philippi | 407/114 |
| 4,812,087 | 3/1989 | Stashko | 407/59 |

Primary Examiner—Frederick R. Schmidt
Assistant Examiner—Mark F. Frazier
Attorney, Agent, or Firm—David J. Koris

[57] ABSTRACT

A center cutting end mill incorporating indexable inserts with positive axial rake angles. Multisegmented rake faces provide support for positive rake cutting edges enabling an improved feed rate.

6 Claims, 7 Drawing Sheets

*FEED RATE 25% FASTER

.250 AXIAL CUT/1.00 RADIAL CUT

CENTER AND PERIPHERAL CUTTING END MILL

Field of the Invention

The present invention pertains to center cutting end mills and more particularly to end mills employing indexable lay-down inserts.

Background of the Invention

The milling of internal geometric configurations in metals has traditionally required an array of tools to begin the milling, remove the desired amount of rough material, and to finish the piece both with respect to surface finish and corner geometries. Forming an internal opening in a piece of aluminum, titanium, or carbon steel for example, requires that a pilot hole be drilled before an end mill can be employed. One disadvantage of traditional end mills is that they either fail to provide sufficient depth of cut or fail to provide inadequate feed rates during operation. Although ball nose end mills afford enhanced penetration, additional time must be spent in remilling the radiused corners.

Another problem with the beforementioned attempts is that in order to maintain both high efficiency as well as an elevated feed rate, neutral to positive rake cutting edges are required. Attempts at placing positive cutting edges on the end face have resulted in excessive weakening of the tool body. In addition, the loading of the cutting edges in the center cutting position limit axial rake angles to neutral or zero degrees true rake.

Several attempts at alleviating these problems have been made. For example, in Neumueller, U.S. Pat. No. 4,566,827, rhomboid shaped inserts are secured both on the nose and periphery providing only one effective cutting tooth. In Mizuno, U.S. Pat. No. 4,252,480 a ball nose end mill is disclosed employing identical arcuate triangular cutting inserts. Both embodiments however, provide only limited feed rates though they operate to remove about the same cubic inch of material per unit time or (tool efficiency). Another attempt is embodied in U.S. Pat. No. 4,252,480 to Hosoi, which discloses a ball end mill having a single cutting tooth. This design also fails to operate at elevated feed and efficiency levels.

An insert therefore which provides both a supported center cutting edge and a highly positive axial rake angle while maintaining tool strength during cutting would be a significant advance in the art of end mill technology.

Another object is to provide a plurality of cutting inserts which are lay-down indexables and which permit tight packing of the tool shank to achieve an enhanced number of effective teeth.

Yet another object of the present invention is to provide unique insert configurations which enhance cutting edge strength while maintaining positive axial rake angles.

SUMMARY OF THE INVENTION

Accordingly, the present invention alleviates the beforementioned problems by providing a unique center cutting end mill tool and an array of inserts where the tool comprises a cylindrical body which rotates about an imaginary axis, centrally disposed therein. The body has both contiguous head and shank members with the head member further including a periphery and an end face substantially perpendicular to the axis. Helically disposed on the periphery are alternating rows of rises and chip gullets which alternately extend through the end face. Recessed pockets are disposed in the rises and end face, emptying out into the chip gullets, and positioned to provide overlapping fields of cutting.

A first insert is disposed in the end face and a second is disposed in the rise pockets. The first insert is of parallelogram form having a major top face parallel to a minor bottom face. The major and minor faces are separated by two pair of oppositely oriented adjoining surfaces comprising a first pair of planar surfaces and a second pair of segmented locating surfaces. The first pair of surfaces are oblique, inclining outwardly from the minor to the major face. The second pair of locating surfaces adjoin the first pair to form both acute and obtuse angles. The second pair are segmented into four planar edge support surfaces; A,B,C and D. Surface A is a chamfer which runs along the point of intersection between the minor face and surface B. Surface B is disposed normal to the minor face. Surface C separates surface B from at least one of the pair of first adjoining side surfaces. Surface D is a land area oriented at an obtuse angle with respect to the major face, which increases from a point of intersection between surface B and the major face and extends at a uniform width along the intersection of the major face and surface C.

The second insert is of triangular form having parallel top and bottom faces. These surfaces are separated by three identical planar side surfaces which incline outwardly from the bottom seating face to the top face. Each of the three side surfaces includes first, second and third side segments which provide support for positive rake cutting edges.

Another advantage of the present invention is that where similar size tool diameters are used, the lay-down triangular inserts, mounted about the periphery of the head, allow for 50% percent greater number of effective teeth per tool than where similar sized parallelogram, rhomboid or circular inserts are used.

A further advantage of the present invention is to provide a center cutting end mill tool having 50% greater feed rate for tools having the same cutting efficiency.

BRIEF DESCRIPTION OF A PREFERRED EMBODIMENT

The above objects and advantages are illustrated and claimed below where:

DETAILED DESCRIPTION OF A PREFERRED EMBODIMENT

Figure 1:
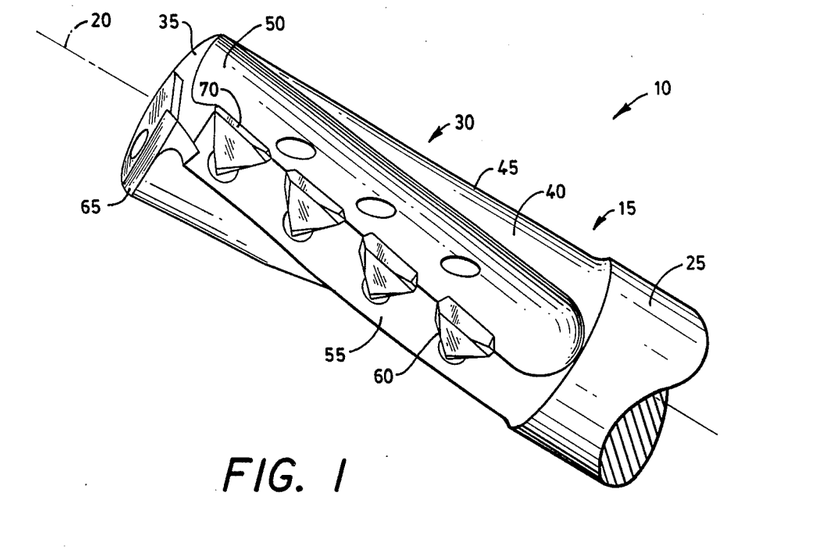
FIG. 1 is a perspective view of an embodiment of the present invention.

Referring to FIG. 1, a center cutting end mill tool 10 is depicted including a cylindrical body 15 which rotates about a longitudinally disposed axis 20. The body 15 comprises a shank 25 and head member 30 which are contiguous and integral. The head member 30 includes a planar end face 35 substantially perpendicular to axis 20 and a cylindrical portion 40 with periphery 45. Disposed about periphery 45 are an array of helically oriented chip gullets 50 and rises 55. In one embodiment the chip gullets extend through end face 35 in an alternating manner. Although a 10 degree right hand helix is preferred, other helical orientations are contemplated. The manner of forming helically disposed gullets to maximize overlapping fields of cutting is known in the art and will not be discussed further.

The rises 55 and end face 35, alternatingly disposed between the chip gullets 50 include a plurality of recessed pockets 60 shaped for receipt of first and second inserts 65 and 70. End face 35 also includes recessed pockets 60 for receipt of first insert 65. The placement of the first insert within end pocket 60 forms a natural continuation of the cutting edges of the helically disposed second inserts.

Figure 2:
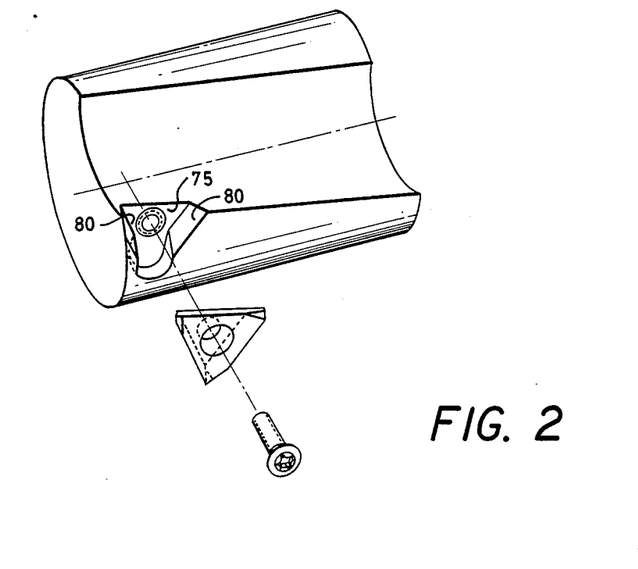
FIG. 2 is an exploded view of a peripheral insert pocket of FIG. 1.

Referring to FIG. 2, each pocket 60, whether on end face 35 or cylindrical portion 40, includes a planar seat surface 75 and at least two adjoining abutment walls 80 which form an angle with said seat 75 for mating contact with abutment surfaces of inserts 65,70. Each pocket is apertured and threaded for receipt of a screw for securing the inserts.

Figure 3:
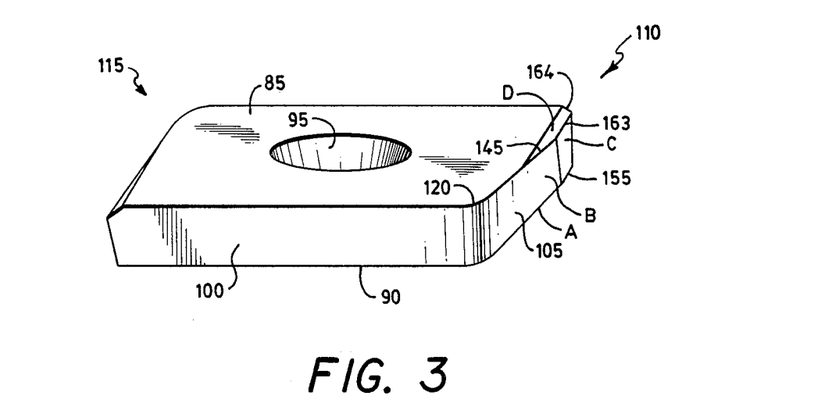
FIG. 3 is a perspective view of the center cutting insert of FIG. 1.

Referring to FIG. 3, first insert 65 is generally a wafer of hardened materials such as tungsten carbide or a ceramic. Preferably carbide grade VC-2 or VC-3 are used due to their durability in abrasive materials. Grades such as VC-101 or VIN are preferred in applications of difficult to machine materials such as titanium. These and other desirable materials are available from the present assignee. The particular choice of material depends in part on the specification of the part being machined and the material being cut.

First insert 65 includes parallel major 85 and minor 90 faces traversed by an aperture 95 and separated by two pair of oppositely oriented adjoining side surfaces 100, 105. Although other methods of securing such as the use of camming surfaces and clamps are known in the art, for purposes of clarity the use of a screw recessed in the inserts will only be discussed herein.

The first pair of adjoining surfaces 100 are oblique with respect to minor face 90, inclining outwardly at an obtuse angle of between about 90 to 120 degrees and at an acute angle from about 60 to 90 degrees with respect to major face 85.

Preferably obtuse and acute angles or 75 degrees and 105 degrees are used. At acute angles of 75 degrees, a positive axial rake of about 10 degrees is generated. Preferably, the first insert is secured in end face 35 at a neutral radial rake angle.

Figure 4:
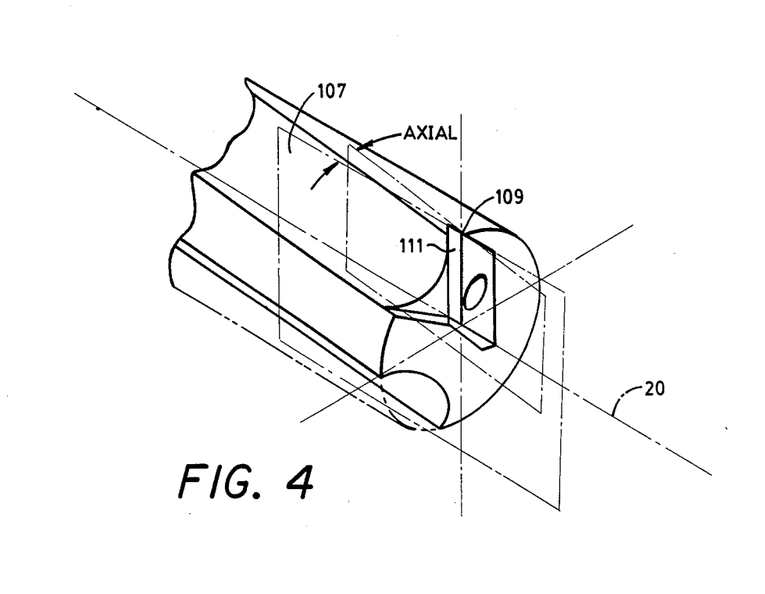
FIG. 4 is a perspective view as in FIG. 1 illustrating the axial rake angle.

As is known in the art and illustrated in FIG. 4, "axial rake" is a term used to define the angular relationship between a reference plane 107 which passes through the cutter body axis 20 and the inserts cutting corner 109 and the rake face 111 or face which sees the work piece. The present invention provides an 8 degree to 10 degree positive axial rake angle which results in improved performance.

Figure 5:
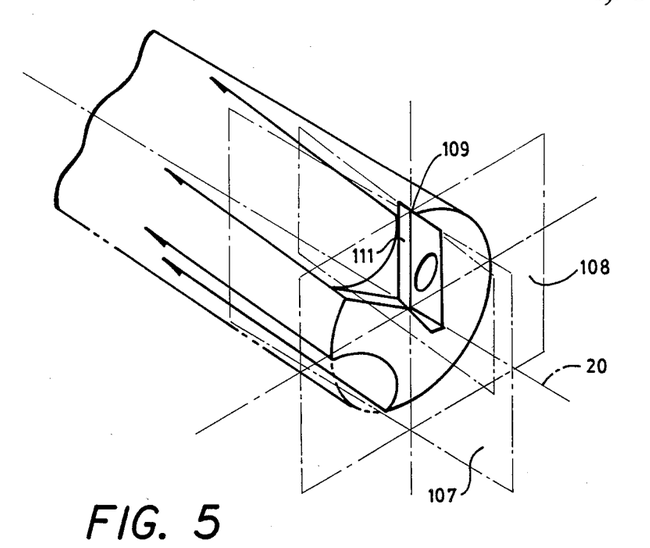
FIG. 5 is a perspective view of the peripheral cutters of FIG. 1 illustrating the radial rake angle.

Referring to FIGS. 5, the term "radial rake" defines the angular relationship between the angle formed by the reference plane 107 and the rake face 111 as measured in the plane 108 perpendicular to the axis 20. Radial rake is defined as negative where the rake face forms an obtuse angle with the reference planes and slopes toward the direction of cutter rotation.

Referring back to FIG. 3, the first pair of adjoining side surfaces 100 intersect with the second pair of segmented locating surfaces 105 at both an acute angle 110 of about 60 degrees and an obtuse angle 115 of about 120 degrees. Although other insert configurations are contemplated by the present invention for first insert 65, a parallelogram is preferred due to the fact that it will cover the entire center cutting area. On cutters larger than 1¼ inches in diameter, the use of multiple inserts are contemplated.

Obtuse angles 115 includes corner 120 radiused at about 0.0468 inches to about 0.093 inches. Use of a radiused corner to prevent chipping of the insert is well known in the art and is especially useful where ceramic or cermet materials are desired.

The second pair of surfaces 105, segmented for edge strengthening and abutment within pockets 60, includes four planar surfaces A,B, C and D.

Surface A is a chamfer which intersects with minor surface 90 at an oblique angle; preferable obtuse with respect to minor face 90 and preferably between about 125 degrees to about 155 degrees. Surface A also intersects at least one of the first adjoining surfaces 100 also at an obtuse angle of about 115 degrees to about 125 degrees.

Surface B is oriented substantially normal to an imaginary plane containing major face 85 and is bound on one side by line 145 formed by the intersection with major face 85 and is diminishing from the plane of major face 85 at an acute angle. Surface B is bound on another side by a line 150 formed by the intersection with surface C at an angle of about 105 degrees to about 115 degrees.

Surface C is bound on one side by chamfer surface A; the intersection therewith forming a line 155 which diminishes toward the corner 160 formed by minor face 90, first adjoining surface 100 and surface C. Line 155 forms an acute angle with respect to an imaginary plane including the minor face 90. Surface C is separated from major surface 85 by surface D.

Surface D is bound on one side by major face 85, by first adjoining surface 100, and by surfaces B and C. Surface D intersects with major face 85 and surface B at obtuse angles of about 135 degrees, and at least one of the first adjoining surfaces 100 at an acute angle to form a cutting edge having a range of angles from about 65 degrees to about 75 degrees. The intersection of surface C with surface D forms a line 163 which is parallel to major face 85.

Surfaces A and D are formed by passing a grind wheel across the planar surface B at the desired angles. Surface C may also be ground onto surface B after forming the above. Although grinding is the preferred method when tungsten carbide is used, other methods of forming the faces may be used. For example, when forming the inserts from tungsten carbide powder, the disclosed surfaces may be pressed prior to sintering. The methods presented above are by way of example only and are not presented as limitations.

Figure 6:
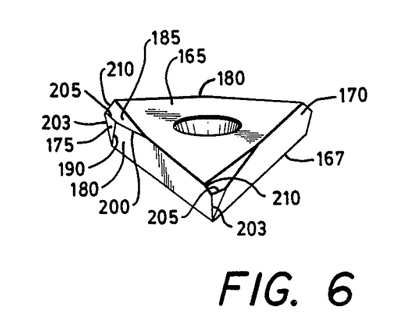
FIG. 6 is a perspective view of side view of the peripheral cutters of FIG. 1; insert of FIG. 4
Figure 7:
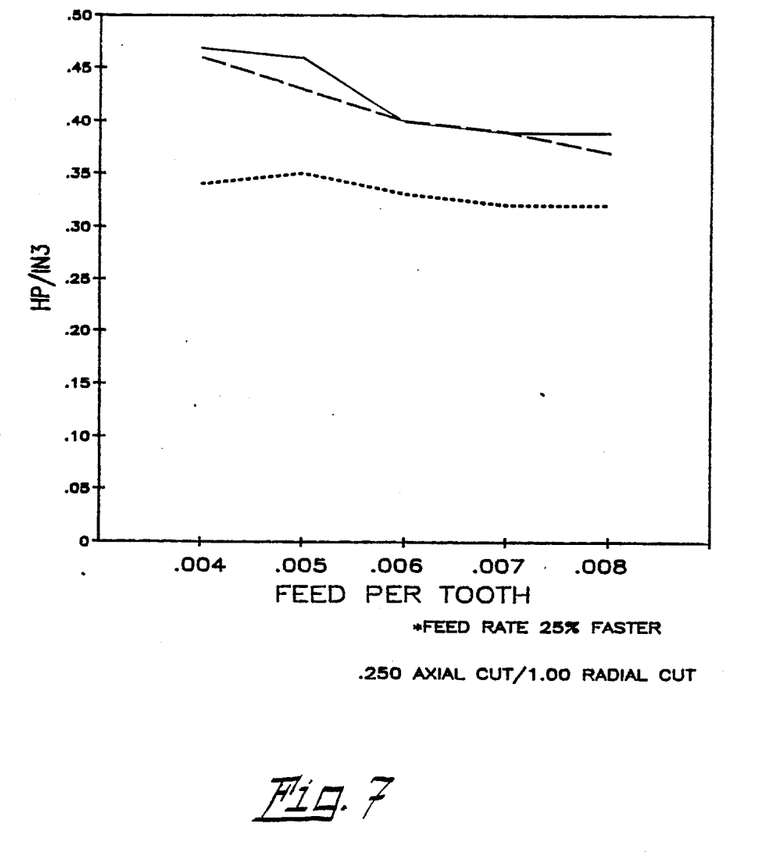
FIG. 7-10 depict graphs of various speeds.
Figure 8:
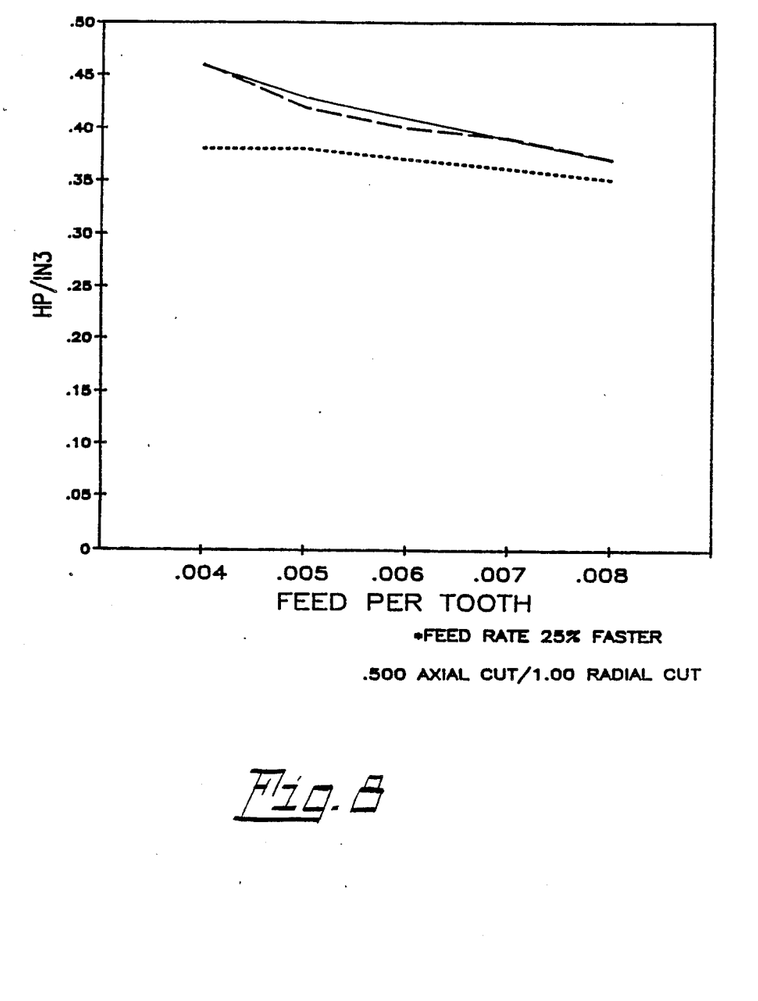
Figure 9:
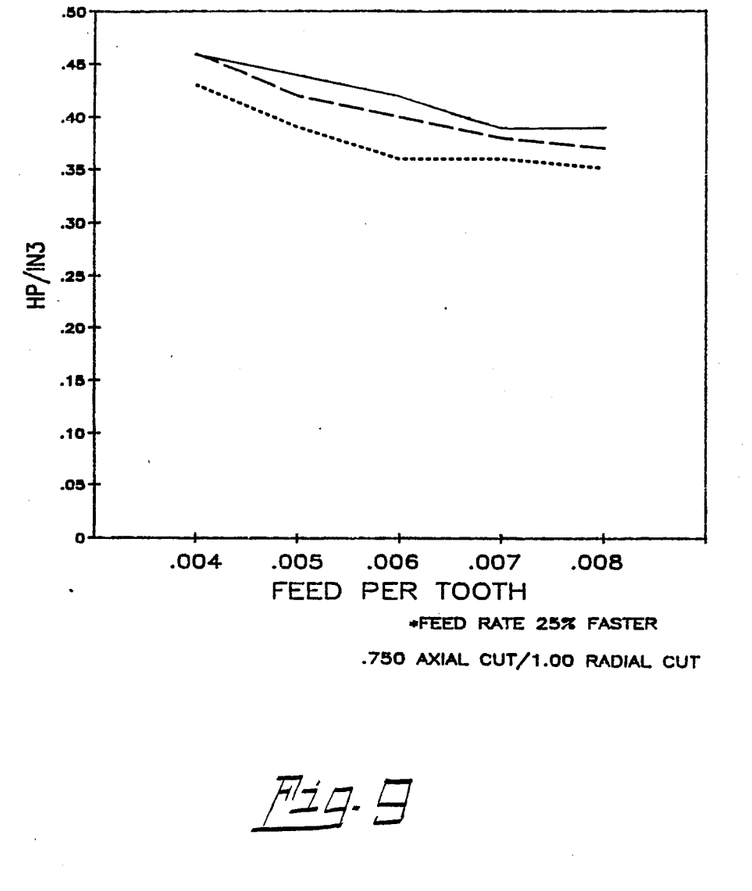
Figure 10:
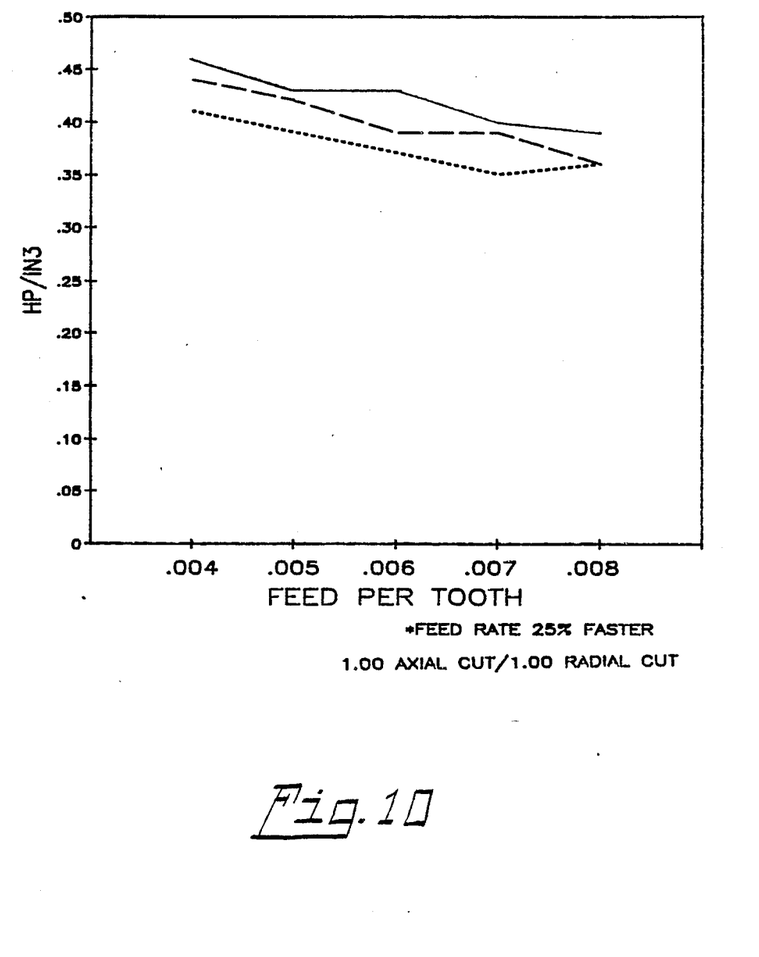

The present invention also contemplates a second insert 70, illustrated in FIG. 6, which like first insert 65 is also made from hardened materials including tungsten carbide and ceramics. The second insert 70 is seated in recessed pockets 60 oriented about peripheral surface 45 in rises 55. The second insert is preferably of triangular form having parallel planar top 165 and bottom 167 faces separated by substantially planar side surfaces 170. The side surfaces 170 incline outwardly from the bottom face 167 to top face 165 to form obtuse angles of about 110 degrees.

Each of the side surfaces 170 include three segmented planes: first segment 175, second segment 180 and third segment 185.

The first segment 175 intersects with the second segment 180 to form an obtuse angle of about 110 degrees. The intersection further forms a first line 190 which may be acute with respect to a plane containing the top face but is preferably substantially normal with top face 165. The second segment is also bound by the third segment 185 the intersection therewith resulting in a second line 200 which diminishes from top face 165 toward first line 190 at an acute angle with respect to an imaginary plane containing the top face and formed as a result of the formation of the third segment 185. In addition, first segment 175 intersects with the second segment 180 at an acute angle to form a third line 203 which is oriented at an obtuse angle of about 120 degrees with respect to the bottom face 167.

The first segment 175 intersects the third segment 185 to form a first cutting edge 205 which is substantially parallel with respect to top face 165.

The third segment 185 intersects top face 165 at an obtuse angle of between about 125 to about 135 degrees. The third segment also is bound on one side by the second segment 180, the intersection therewith forming a second cutting edge 210 which extends from the intersection of the first cutting edge 205 to top face 165 at an obtuse angle of about 125 degrees to about 135 degrees as measured from the plane containing the third side segment 185.

The first and second cutting edges of the second insert preferably include a positive axial rake angle of between about 8 to 10 degrees and a negative radial rake angle of between about 4 degrees to about 6 degrees. At axial rake angles lower than 10 degrees, surface feed rate is diminished. As axial rake angles approach and extend beyond 12 degrees, heel clearance is lost. At radial rake angles of less than 4 degrees negative, cutting efficiencies are diminished.

Tool efficiency and feed rates were evaluated for a number of center cutting end mill tools currently available in the industry. As set down below, a significant increase in feed rate and an unexpected similarity in cutting efficiencies was observed in the present invention.

The evaluation was between one inch diameter center cutting end mills with one effective cutting tooth and the present invention employing one and a half effective cutting teeth. The present invention was tested with a 10 degree positive axial rake and a 4 degree negative radial rake. A Mitsubishi OKK 800 MVC Vertical Machining Center capable of delivering 30 horsepower was employed throughout the test. The machine was run at 3500 rpm at 917 surface feet per minute and a 400 inch table travel was used. The material being cut was a 4 inch by 4 inch by 10 inch piece of AISI 6061T6 of wrought aluminum having 45KPSI tensile strength. After cleaning and squaring, 0.250 inches axial by 1 inch radial cuts were made. Feed to effective tooth ratio was measured in 0.001 inch increments from 0.005 to 0.014 inches and plotted against the ratio of horsepower to cubic inch removal or effective horsepower as shown in FIGS. 7–10.

As illustrated above, the present invention detailed in the dotted line section performed at a 50% improved feed rate over the second center cutting end mill illustrated as dashed lines. The second end mill employed one effective cutting tooth with inserts oriented at 4 degree positive axial rake and 0 degrees radial rake. The second center cutting end mill illustrated as dashed lines is currently pending as an application for GTE Valenite Corporation as U.S. Ser. No. 259,647. The third end mill illustrated as a solid line also employs one effective cutting tooth with 5 degrees axial and 7 degrees positive radial rake angles. The tool currently disclosed by U.S. Pat. No. 4,566,827.

Other embodiments and methods of manufacture will become apparent to those of ordinary skill in the art after examining the objects, advantages, drawings, specification, and claims.

I claim:

1. A center cutting end mill tool comprising
a body rotatable about a centrally disposed axis,
said body having contiguous and integral shank and head members,
said head of cylindrical form having a periphery and an end face substantially perpendicular to said axis,
said head further comprising an array of helically oriented rises and chip gullets,
said chip gullets extending alternately from said shank through said end face to provide overlapping fields of cutting,
said rises and end face having recessed pockets for receipt of indexable inserts,
said inserts comprising a first insert positioned in said end face pockets to provide for center cutting and a second insert positioned in said rise pockets,
said first insert being of parallelogram form having parallel major and minor faces traversed by an aperture and separated by two pair of oppositely oriented adjoining surfaces,
said adjoining surfaces comprise a first pair of planar surfaces and a second pair of segmented locating surfaces,
said first pair of surfaces are oblique, inclining outwardly from said minor face toward said major face,
said first pair of surfaces intersecting said second locating surfaces at acute and obtuse angles,
said second locating surfaces being segmented comprising surfaces A, B, C, and D,
said A surface being a chamfer which intersects said minor face and surface B to form obtuse angles,
said A surface providing pocket clearance,
said B surface oriented substantially normal to an imaginary plane containing said major face forming a line which diminishes at an acute angle with respect to said imaginary plane,
said B surface intersecting surface C at an obtuse angle to form a line which is substantially normal to a line formed by said intersection of surfaces A and B,
surface C intersecting surface A to form a line which diminishes toward said intersection of said minor face and at least one of said first surfaces,
said diminishing line forming an acute angle with respect to an imaginary plane including said minor face,
said C surface separated from said major face by surface D, said C surface intersecting said D surface at an obtuse angle to form a line which is parallel to said major face, said D surface intersecting said major face and said B surface at obtuse angles and said first surface at an acute angle to form a pair of opposed cutting edges, said cutting edges having a positive axial rake of about 8 to about 10 degrees, said second inserts having triangular form with substantially planar top and bottom faces separated by planar side surfaces inclining from said bottom face to said top face at an obtuse angle, each of said side surfaces comprising a first, a second, and a third side segment, said first side segment intersecting said, second side segment at an obtuse angle forming a first line which is substantially normal to said top face, said second side segment intersecting said third side segment at an obtuse angle to form a second line which diminishes from said top face toward said first line at an acute angle with respect to an imaginary plane passing through said top face, and said first side segment at an acute angle to form a third-line which, is oriented at an obtuse angle with respect to said bottom face, said first side segment intersecting said third side segment to form a first cutting edge which is substantially parallel with respect to said top face, said third side segment intersecting said top face at an obtuse angle, said third side segment intersecting said second side segments to form a second cutting edge which extends from said first cutting edge to said top face at an obtuse angle with respect to an imaginary plane containing said third side segment, said first cutting edges having a positive axial rake of between about 8 to about 10 degrees positive and said second cutting edge having a negative axial rake of about 4 to about 6 degrees.

2. The end mill of claim 1 wherein said helically disposed inserts provide one and a half effective cutting teeth.

3. The end mill of claim 2 wherein said first insert is seated in said end face at a 0 degree radial rake angle.

4. A center cutting end mill tool comprising
a body rotatable about a centrally disposed axis,
said body having contiguous shank and head members,
said head of cylindrical form having a periphery and an end face substantially perpendicular to said axis,
said head further comprising an array of helically oriented rises and chip gullets,
said chip gullets extending alternately from said shank through said end face to provide overlapping fields of cutting,
said rises and end face having recessed pockets for receipt of indexable inserts,
said inserts comprising a first insert positioned in said end face pockets to provide for center cutting and a second insert positioned in said rise pockets,
said first insert being of parallelogram form having parallel major and minor faces traversed by an aperture and separated by two pair of oppositely oriented adjoining surfaces,
said adjoining surfaces comprising a first pair of planar surfaces and a second pair of segmented locating surfaces, said first pair of surfaces inclining outwardly from said minor face to said major face forming obtuse angles of about 90 to about 120 degrees and acute angles of about 60 to about 90 degrees, said first pair of planar surfaces intersecting said second locating surfaces at acute angles of about 60 degrees and obtuse angles of about 120 degrees, said second locating surfaces being segmented comprising planar surfaces A, B, C, and D, said A surface being a chamfer which intersects said minor face and surface B to form obtuse angles of about 135 degrees and said first surface to form a radiused curve, said A surface providing pocket clearance, said B surface oriented substantantially normal to an imaginary plane containing said major face forming a line which diminishes at an acute angle with respect to said imaginary plane, said B surface intersecting surface C at an obtuse angle of about 135 degrees to form a line which is substantially normal to a line formed by said intersection of surfaces A and B, surface C intersecting surface A to form a line which diminishes toward said intersection of said minor face and at least one of said first surfaces, said diminishing line forming an acute angle with respect to an imaginary plane including said minor face, said C surface separated from said major face by section D, said C surface intersecting said D surface at an obtuse angle of about 135 degrees to form a line which is parallel to said major face, said D surface intersecting said major face and said B surface at obtuse angles and said first surface at an acute angle of about 75 degrees to form a pair of opposed cutting edges, said cutting edges having a positive axial rake of about 8 to about 10 degrees, said second insert having triangular form with substantially planar top and bottom faces separated by planar side surfaces inclining from said bottom face to said top face at an obtuse angle of about 110 degrees, each of said side surfaces comprising a first, a second, and a third side segment, said first side segment intersecting said second side segment at an obtuse angle of about 110 degrees forming a first line which is substantially normal to said top face, said second side segment intersecting said third side segment at an obtuse angle to form a second line which diminishes from said top face toward said first line at an acute angle with respect to an imaginary plane passing through said top surface, said first side segment intersecting said third side segment to form a first cutting edge which is substantially parallel with respect to said top face, said third side segment intersecting said top face at an obtuse angle of about 135 degrees, said second side segment intersecting said first side segment at an acute angle to form a third line which is oriented at an obtuse angle of about 110 degrees with respect to said bottom face, said third side segment intersecting said second side segment to form a second cutting edge which extends from said first cutting edge to said top face at an obtuse angle of about 125 degrees with respect to an imaginary plane containing said third side segment,
said cutting edges having a positive axial rake of between about 8 to about 10 degrees positive and said second cutting edges having negative axial rake angles of about 4 to about 6 degrees.

5. The end mill of claim 4 wherein said helically disposed inserts provide one and a half effective cutting teeth.

6. The end mill of claim 5 wherein said first insert is seated in said end face at a 0 degrees radial rake angle.

* * * * *